(12) United States Patent
Nam et al.

(10) Patent No.: US 11,594,900 B2
(45) Date of Patent: Feb. 28, 2023

(54) BATTERY PACK HAVING FASTENING RECOGNITION FUNCTION

(71) Applicant: LG CHEM, LTD, Seoul (KR)

(72) Inventors: Ho Chol Nam, Chungcheongbuk-Do (KR); Dong Hyun Kim, Sejong (KR); Hak In Kim, Chungcheongbuk-Do (KR)

(73) Assignee: LG Energy Solution, Ltd., Seoul (KR)

( * ) Notice: Subject to any disclaimer, the term of this patent is extended or adjusted under 35 U.S.C. 154(b) by 359 days.

(21) Appl. No.: 16/652,537

(22) PCT Filed: Aug. 24, 2018

(86) PCT No.: PCT/KR2018/009782
§ 371 (c)(1),
(2) Date: Mar. 31, 2020

(87) PCT Pub. No.: WO2019/088430
PCT Pub. Date: May 9, 2019

(65) Prior Publication Data
US 2020/0244080 A1 Jul. 30, 2020

(30) Foreign Application Priority Data
Nov. 6, 2017 (KR) .................. 10-2017-0146866

(51) Int. Cl.
*H02J 7/00* (2006.01)
*H01M 10/42* (2006.01)

(52) U.S. Cl.
CPC ......... *H02J 7/0031* (2013.01); *H01M 10/425* (2013.01); *H02J 7/0014* (2013.01);
(Continued)

(58) Field of Classification Search
CPC ...................................................... H02J 7/00
See application file for complete search history.

(56) References Cited

U.S. PATENT DOCUMENTS

| 6,208,117 B1 | 3/2001 | Hibi |
| 2005/0127879 A1 | 6/2005 | Sato et al. |

(Continued)

FOREIGN PATENT DOCUMENTS

| CN | 105840032 A | 8/2016 |
| CN | 105938200 A | 9/2016 |

(Continued)

OTHER PUBLICATIONS

Extended European Search Report dated Oct. 19, 2020 issued in corresponding European Patent Application No. 18872702.8.
(Continued)

*Primary Examiner* — Robert Grant
(74) *Attorney, Agent, or Firm* — Morgan, Lewis & Bockius LLP

(57) ABSTRACT

A battery pack in accordance with an exemplary embodiment, which is booted when coupled to an external apparatus, includes: a connector which is a member configured to connect the external apparatus and the battery pack; and a booting circuit configured to start operation of the battery pack when the battery pack and the external apparatus are coupled. The connector includes: a (+) output terminal connected to a (+) output terminal of the battery pack; a coupling check terminal configured to check whether the external apparatus and the battery pack are coupled; a data transceiving terminal configured to tranceive data between the external apparatus and the battery pack; and a (−) output terminal connected to a (−) output terminal of the battery pack.

9 Claims, 3 Drawing Sheets

(52) U.S. Cl.
CPC ........ *H02J 7/00036* (2020.01); *H02J 7/0045* (2013.01); *H02J 7/0047* (2013.01); *H02J 7/00302* (2020.01); *H02J 7/00306* (2020.01); *H01M 2010/4271* (2013.01)

(56) References Cited

U.S. PATENT DOCUMENTS

| | | |
|---|---|---|
| 2007/0029972 A1 | 2/2007 | Lampe-Onnerud et al. |
| 2008/0048614 A1 | 2/2008 | Partin et al. |
| 2008/0238370 A1* | 10/2008 | Carrier .................. H02J 7/0021 320/136 |
| 2011/0305925 A1 | 12/2011 | Ro |
| 2013/0175994 A1 | 7/2013 | Endo et al. |
| 2015/0037656 A1 | 2/2015 | Noda et al. |
| 2016/0049636 A1 | 2/2016 | Takano |
| 2016/0156206 A1 | 6/2016 | Yamaji et al. |
| 2017/0025054 A1 | 8/2017 | Eo et al. |
| 2017/0250548 A1 | 8/2017 | Eo et al. |

FOREIGN PATENT DOCUMENTS

| | | |
|---|---|---|
| EP | 3211753 A1 | 8/2017 |
| JP | 2000-148303 A | 5/2000 |
| JP | 2001-045670 A1 | 2/2001 |
| JP | 2001-142577 A | 5/2001 |
| JP | 2008-312442 A | 12/2008 |
| JP | 2009-502008 A | 1/2009 |
| JP | 2009-543531 A | 12/2009 |
| JP | 2011-109768 A | 6/2011 |
| JP | 5084117 B2 | 11/2012 |
| JP | 2013-142638 A | 7/2013 |
| JP | 2013-211146 A | 10/2013 |
| JP | 2014-049207 A | 3/2014 |
| JP | 5888187 B2 | 3/2016 |
| JP | 2016-103925 A | 6/2016 |
| JP | WO2014/148228 A1 | 2/2017 |
| JP | 2017-175684 A | 9/2017 |
| KR | 10-1510963 B1 | 4/2015 |
| KR | 10-1628606 B1 | 6/2016 |
| KR | 10-2017-0100355 A | 9/2017 |
| WO | 2013/165597 A1 | 11/2013 |

OTHER PUBLICATIONS

First Office Action dated Dec. 14, 2020, issued in corresponding Japanese Patent Application No. 2020-500596.
Second Office Action dated Aug. 24, 2021, issued in corresponding Japanese Patent Application No. 2020-500596.
International Search Report issued in corresponding International Patent Application No. PCT/KR2018/009782, dated Dec. 4, 2018.
Notice of Allowance dated Apr. 18, 2022, issued in corresponding Japanese Patent Application No. 2020-500596.
First Office Action dated Jul. 18, 2022, issued in corresponding Chinese Patent Application No. 201880045588.9. Note: JP 2001-142577A and JP 2001-45670A cited therein are already of record.

* cited by examiner

[fig 1]
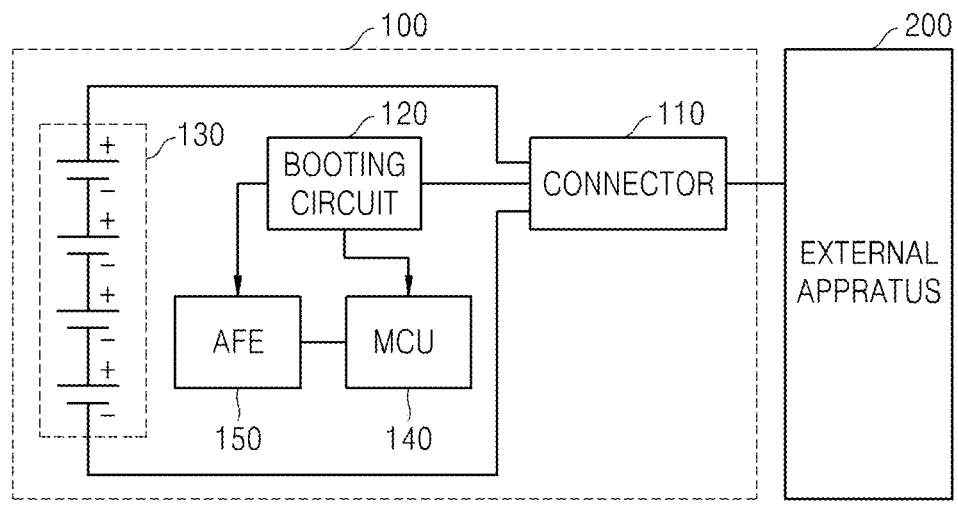

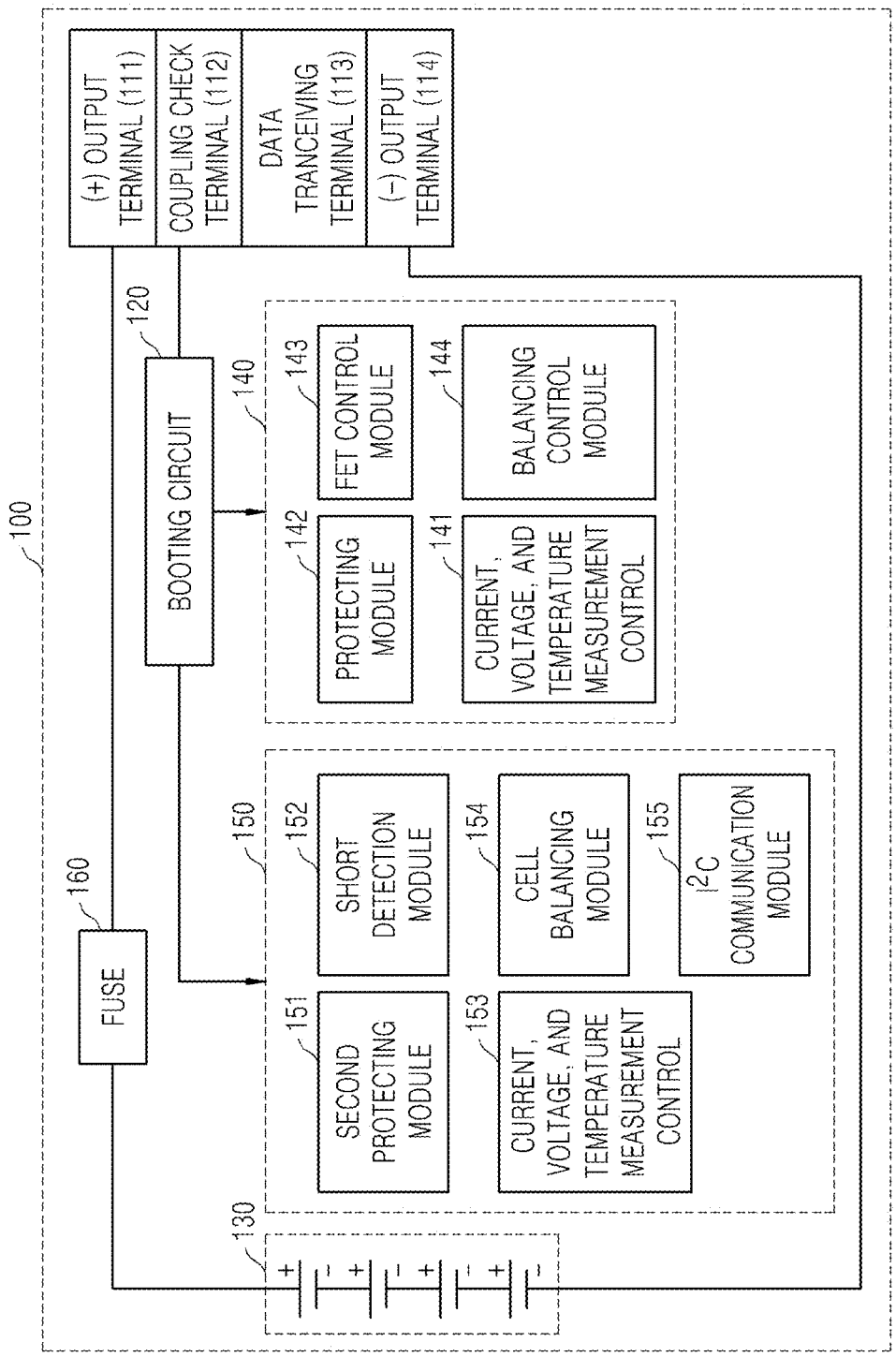
[fig 2]

[fig 3]
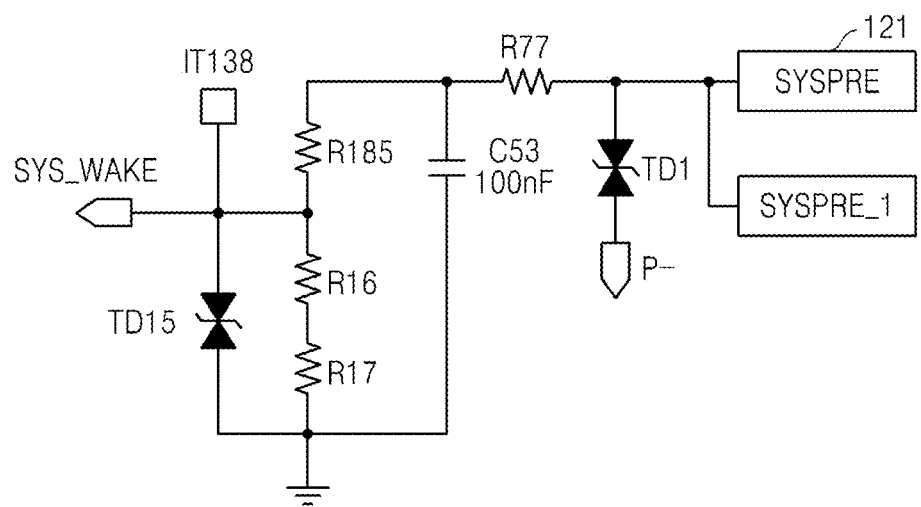

BATTERY PACK HAVING FASTENING RECOGNITION FUNCTION

TECHNICAL FIELD

The present disclosure relates to a battery pack equipped with a function of booting the battery pack when the battery pack is coupled to an external apparatus.

BACKGROUND ART

Recently, high output secondary batteries using a high-energy density nonaqueous electrolyte have been developed. A large-capacity secondary battery is provided by connecting a plurality of high-output secondary batteries in series so as to be usable for an apparatus, such as an electric vehicle, requiring strong power for driving a motor.

As such, a single large-capacity secondary battery (hereinafter referred to as "battery") is composed of a plurality of batteries generally connected in series. To this end, there is provided a control unit that monitors and controls a state of the battery on the whole. The control unit monitors the voltage, current, temperature, etc., of a battery, estimates the state of charge (SOC) of the battery by calculation, and controls the battery.

Meanwhile, such a control unit operates in a discharging or charging state, but when the battery is not a discharging or charging state, since the control unit consumes power, it is necessary to turn off the control unit to reduce power consumption.

As such, when the battery was not in a discharging or charging state, in related arts, in order to reduce power consumption of the control part, the control unit was allowed to operate in a sleep mode and the battery was continuously checked whether to be coupled to an external apparatus.

However, when the control unit operating in the sleep mode is left for a long period of time, battery discharge may occur.

Thus, the present disclosure proposes a battery pack which allows the battery to enter into a shutdown mode or a power-down mode when the battery is not coupled to an external apparatus, and release the shutdown mode or the power-down mode when the battery is coupled to an external apparatus.

DISCLOSURE OF THE INVENTION

Technical Problem

The present disclosure provides a battery pack which operates only when coupled to an external apparatus.

Technical Solution

In accordance with an exemplary embodiment, a battery pack, which is booted when coupled to an external apparatus, includes: a connector which is a member configured to connect the external apparatus and the battery pack; and a booting circuit configured to start operation of the battery pack when the battery pack and the external apparatus are coupled, wherein the connector includes: a (+) output terminal connected to a (+) output terminal of the battery pack; a coupling check terminal configured to check whether the external apparatus and the battery pack are coupled; a data transceiving terminal configured to tranceive data between the external apparatus and the battery pack; and a (−) output terminal connected to a (−) output terminal of the battery pack.

Meanwhile, the battery pack may further include: a plurality of battery cells; an MCU configured to control the plurality of cells; an AFE configured to control an interface between the MCU and the plurality of batter cells, wherein the booting circuit may be provided between the AFE and the coupling check terminal, and when the battery pack and the external apparatus are coupled, an output of the (+) output terminal of the battery pack may be input to the coupling check terminal via the external apparatus and boot the AFE which has been shut down.

Meanwhile, the booting circuit may include a voltage distribution circuit configured to distribute a voltage of the battery pack Meanwhile, the booting circuit may boot the AFE which has been shut down, and then transmit, to the MCU, coupling state check information which informs the MCU about whether the battery pack and the external apparatus are coupled.

Meanwhile, the AFE may include: a second protecting module; a short detection module; a current, voltage, and temperature measuring module configured to measure current, voltage, and temperature of the cells; a cell balancing module configured to uniformly adjust charging amounts of the plurality of cells; and an VC communication module configured to communicate with the MCU, wherein the AFE, when receiving a shutdown command from the MCU, may be shutdown Meanwhile, the MCU may include: a current, voltage, and temperature control module configured to control the current, voltage, and temperature of each of the plurality of cells; a protecting module configured to protect a battery from overcharge and over-discharge on the basis of the current, voltage, and temperature; an FET control module configured to control an FET of the battery pack; and a balancing control module configured to control balancing of the plurality of cells, wherein when the coupling state check information received from the booting circuit is a coupled state, the MCU may receive power via the AFE and operates, and when the coupling state check information received from the booting circuit is an uncoupled state, a shutdown entering signal may be generated to shut down the MCU, and a shutdown signal may be transmitted to the AFE.

Meanwhile, the external apparatus coupled to the battery pack in accordance with an exemplary embodiment may be configured to include a battery coupling part which couples the battery pack and the external apparatus, and the battery coupling part may be configured to include a conductive member which forms a current path between the (+) output terminals of the connector and the coupling check terminal of the connector.

Meanwhile, the conductive member may have a predetermined resistance value, and the battery pack, according to the predetermined resistance value, may recognize the types of the external apparatus coupled to the battery pack.

Advantageous Effects

According to the present disclosure, a battery pack operates only when coupled to an external apparatus, and therefore has very little power consumption. Thus, even when the battery is stored for a long time period, a low-voltage problem caused by the discharge of the battery pack may not occur.

BRIEF DESCRIPTION OF THE DRAWINGS

FIG. 1 is a configurational view in accordance with an exemplary embodiment.

FIG. 2 is a more specific configurational view in accordance with an exemplary embodiment.

FIG. 3 is an exemplary circuit diagram of a voltage distribution circuit in accordance with an exemplary embodiment.

MODE FOR CARRYING OUT THE INVENTION

Hereinafter, embodiments of the present invention will be described in detail with reference to the accompanying drawings so that the present invention may easily be carried out by a person with ordinary skill in the art to which the invention pertains. The present disclosure may, however, be embodied in different forms and should not be construed as limited to the embodiments set forth herein. In the drawings, anything unnecessary for describing the present disclosure will be omitted for clarity, and like reference numerals in the drawings denote like elements.

Although the terms such as "first" and "second" are used herein to describe various elements, these elements should not be limited by these terms. These terms are only used to distinguish one element from other elements. For example, a first element could be termed a second element, and similarly, a second element could be termed a first element, without departing from the scope of the present invention. In the following description, the terms are used only for explaining a specific exemplary embodiment while not limiting the present invention. The singular forms are intended to include the plural forms as well, unless the context clearly indicates otherwise.

Throughout the description, it will be understood that when an element is referred to as being 'connected' or 'coupled' to another element, it can be 'directly connected or coupled' to the other element, or 'electrically connected to the other element via an intervening element. Furthermore, it will be further understood that when an element is referred to as "including" another element, the element does not exclude the other element but may further include the other element, unless particularly stated otherwise. The terms "step of (performing)" or "step of (doing)" used in the entire specification of the present disclosure does not mean "step for".

The terms used in the present invention are selected from the general terms that are widely used at present if possible and in consideration of the functions in the present invention, but the terms may be changed depending on the intent of a person skilled in the art or the precedents, or by the emergence of new technologies, etc. Further, certain terms may be arbitrarily chosen, in which case the corresponding meaning will be described in detail in the present invention. Accordingly, the terms used in the present invention should be defined not simply on the basis of the names of the terms, but on the basis of the meanings of the terms and the context throughout the description.

1. Battery Pack Connected to External Apparatus and Automatically Started

FIG. 1 is a view schematically illustrating configuration of a battery pack in accordance with an exemplary embodiment.

FIG. 2 is a view illustrating in detail detailed configuration of a battery pack in accordance with an exemplary embodiment.

Hereinafter with reference to FIGS. 1 and 2, a battery pack in accordance with an exemplary embodiment will be described.

A battery pack 100 in accordance with an exemplary embodiment, when coupled to an external apparatus 200, may automatically be booted, and when the coupling to the external apparatus is released, may enter into a shutdown mode.

More specifically, the battery pack 100 of an exemplary embodiment may be configured to include: a connector 110 which is a member for connecting the external apparatus 200 and the battery pack 100; and a booting circuit 120 which allows the battery to start operation when the battery pack 100 and the external apparatus 200 are coupled.

Meanwhile, the connector 110 may be configured to include: a (+) output terminal 111 connected to a (+) output terminal of the battery pack 100; a coupling check terminal 112 for checking whether the external apparatus 200 and the battery pack 100 are coupled; a data transceiving terminal 113 for transceiving data between the external apparatus 200 and the battery pack 100; and a (−) output terminal 114 connected to a (−) output terminal of the battery pack 100.

Meanwhile, the battery pack 100 may be configured to further include: a plurality of battery cells 130; an MCU 140 which controls the plurality of cells 130; and an AFE 150 which controls an interface between the plurality of battery cells 130.

Meanwhile, the booting circuit 120 is provided between the AFE 150 and the coupling check terminal 112. When the battery pack 100 and the external apparatus 200 are coupled, an output of the (+) output terminal of the battery pack 100 may be input to the coupling check terminal 112 via the external apparatus, and boot the AFE 150 which has been shut down.

Meanwhile, the booting circuit 120 may be configured to include a system input node 121 connected to the external apparatus 200 and a voltage distribution circuit which distributes the voltage of the battery pack.

More specifically, the voltage distribution circuit may be configured to include a plurality of resistors and a plurality of FETs, and the plurality of FETs may operate according to a voltage applied between the (+) output terminal of the battery pack and a ground.

For example, the voltage distribution circuit may be configured as illustrated in FIG. 3.

When the voltage distribution circuit is configured as such, a booting voltage applied to the AFE by the resistors constituting the voltage distribution circuit may be smaller than the output voltage of the battery pack.

Meanwhile, the booting circuit 120, after booting the AFE 150 which has been shut down, may transmit, to the MCU 140, coupling state check information, which is the state information of a system input node of the booting circuit 150, and inform the MCU about whether the battery pack 100 and the external apparatus 200 are coupled.

In other words, the booting circuit 120, after booting the AFE 150 which has been temporarily shut down, does not generate a booting signal any more, and may transmit to the MCU 140 only the coupling state check information.

Meanwhile, the coupling state check information transmitted to the MCU 140 may be transmitted continuously or at predetermined periods, or transmitted only when the MCU requests the information.

Meanwhile, the AFE 150 may be configured to include: a second protecting module 151; a short detection module 152; a current, voltage, and temperature measuring module 153 which measures the current, voltage, and temperature of cells; a cell balancing module 154 which adjusts charging amounts of the plurality of cells; and an I²C communication module 155 which communicates with the MCU 140.

Meanwhile, the AFE 150 may be shut down when receiving a shutdown command from the MCU 140.

Meanwhile, the MCU 140 may be configured to include: a current, voltage, and temperature control module 141 which controls current, voltage, and temperature; a protecting module 142 which protects the batteries from overcharge and over-discharge of the batteries on the basis of the current, voltage, and temperature; a FET control module 143 which controls the FET of the battery pack; and a balancing control module 144 which controls the balancing of the plurality of cells.

Meanwhile, the MCU 140, when the coupling state check information received from the booting circuit 120 is a coupling state, may operate by receiving power through the AFE 150, and when the coupling state check information received from the booting circuit 120 is a coupling released state, a shutdown entering signal may be generated to shutdown the MCU 140 itself, and may transmit the shutdown signal to the AFE 150.

In other words, when the battery pack 100 in accordance with an exemplary embodiment is coupled to an external apparatus 200, the booting circuit 120 boots the AFE 150 using an output voltage of the (+) output terminal of the battery pack, and the booted AFE 150 may apply an operation voltage to boot the AFE 150, and the booted AFE 150 may apply an operation voltage to the MCU 140 to operate the MCU 140.

Meanwhile, when the battery pack 100 in accordance with the exemplary embodiment has been coupled to the external apparatus 200 and then is uncoupled, the booting circuit 120 transmits an uncoupling signal to the MCU 140, the MCU 140 which receives the signal performs a predetermined step for entering into the shutdown mode, and then the MCU 140 itself is shutdown. In addition, before the MCU 140 is shutdown, or at the same time when the MCU 140 is shutdown, the MCU 140 may transmit a shutdown signal to shut down the AFE 150.

Accordingly, when using the battery pack 100 in accordance with the exemplary embodiment, when the battery pack 100 is not in a state of being coupled to an external apparatus 200, the battery pack enters into the shutdown mode, whereby power consumption may be reduced compared to related arts in which the battery pack operates in a sleep mode and checks coupling. Therefore, even when the battery pack is stored for a long time, the problem of occurrence of low vow voltage caused by battery discharge may be reduced.

In addition, in related arts, when the battery pack 100 is shut down, the battery pack should directly be booted to boot the battery pack, but in the battery pack in accordance with an exemplary embodiment even when having been shutdown, when an external apparatus is coupled, the battery pack itself may recognize the coupling to an external apparatus and be booted.

Meanwhile, the battery pack in accordance with the exemplary embodiment may further be provided with a fuse 160 between the plurality of cells constituting the battery pack 100 and the (+) output terminals of the battery pack.

The fuse 160 further provided as such may cutoff an over-current flowing in the battery pack even when the second protecting module of the AFE 150 and the protecting module of the MCU 140 may not normally cutoff the over-current, whereby the stability of the battery may be secured.

Meanwhile, the external apparatus 200 coupled to the battery pack in accordance with the exemplary embodiment may be configured to include a battery coupling part which couples the battery pack and the external apparatus, and the battery coupling part may be configured to include a conductive member which forms a current path between the (+) output terminals of the connector and the coupling check terminal.

More specifically, the conductive member has a predetermined resistance value, and the battery pack, according to the predetermined resistance value, may recognize the types of the external apparatus coupled to the battery pack.

For example, when the predetermined resistance is approximately 10 MΩ or greater, it may be determined that an electronic device using the battery pack as a power source is coupled as an external apparatus, and when the predetermined resistance is less than approximately 1 MΩ, it may be determined that a charger is coupled as an external apparatus.

Meanwhile, the technical idea of the present invention has been specifically described with respect to the above embodiments, but it should be noted that the foregoing embodiments are provided only for illustration while not limiting the present disclosure. In addition, various embodiments may be provided to allow those skilled in the art to understand the scope of the preset invention.

What is claimed is:

1. A battery pack, which is booted when coupled to an external apparatus, comprising:
   a plurality of battery cells;
   an MCU configured to control the plurality of cells;
   an AFE configured to control an interface between the MCU and the plurality of battery cells;
   a connector configured to connect the external apparatus and the battery pack; and
   a booting circuit configured to start operation of the battery pack when the battery pack and the external apparatus are coupled, wherein
   the connector comprises:
   a (+) output terminal connected to a (+) output terminal of the battery pack;
   a coupling check terminal configured to check whether the external apparatus and the battery pack are coupled;
   a data transceiving terminal configured to tranceive data between the external apparatus and the battery pack; and
   a (−) output terminal connected to a (−) output terminal of the battery pack,
   wherein the booting circuit is provided between the AFE and the coupling check terminal, and
   wherein, when the battery pack and the external apparatus are coupled, an output of the (+) output terminal of the battery pack is input to the coupling check terminal via the external apparatus and boots the AFE which has been shut down.

2. The battery pack of claim 1, wherein the booting circuit comprises:
   a system input node connected to the external apparatus; and
   a voltage distribution circuit configured to distribute a voltage of the battery pack.

3. The battery pack of claim 2, wherein the booting circuit boots, by means of a system wake signal generated from the voltage distribution circuit, the AFE which has been shut down, and then transmits, to the MCU, coupling state check information which is the state information about the system input node of the booting circuit to inform the MCU about whether the battery pack and the external apparatus are coupled.

4. The battery pack of claim 1, wherein the AFE comprises:
   a second protecting module;
   a short detection module;
   a current, voltage, and temperature measuring module configured to measure current, voltage, and temperature of the cells;
   a cell balancing module configured to uniformly adjust charging amounts of the plurality of cells; and
   an I²C communication module configured to communicate with the MCU,
   wherein the AFE, when booted, supplies power to the MCU to wake up the MCU, and when receiving a shutdown command from the MCU, the AFE is shutdown.

5. The battery pack of claim 3, wherein the MCU comprises:
   a current, voltage, and temperature control module configured to control a current, a voltage, and a temperature;
   a protecting module configured to protect a battery from being overcharged and over-discharged on the basis of the current, the voltage, and the temperature;
   an FET control module configured to control an FET of the battery pack;
   and a balancing control module configured to control balancing of the plurality of cells, wherein
   when the coupling state check information received from the booting circuit is a coupled state, the MCU receives power via the AFE and operates, and
   when the coupling state check information received from the booting circuit is in an uncoupled state, a shutdown entering signal is generated to shut down the MCU, and a shutdown signal is transmitted to the AFE.

6. An electronic apparatus, which is an external apparatus coupled to the battery pack of claim 1, comprising:
   a battery coupling part configured to couple the battery pack and the external apparatus,
   wherein the battery coupling part comprises a conductive member configured to form a current path between the (+) output terminal and the coupling check terminal of a connector.

7. The electronic apparatus of claim 6, wherein the conductive member has a predetermined resistance value, and the battery pack, according to the predetermined resistance value, recognizes the type of the external apparatus coupled to the battery pack.

8. An electronic device comprising a battery pack of claim 1.

9. The electronic device of claim 8, wherein the electronic device is any one selected from the group consisting of cellular phones, tablet computers, laptop computers, power tools, wearable electronic apparatuses, electric vehicles, hybrid electric vehicles, plug-in hybrid electric vehicles, and power storage devices.

* * * * *